J. ALTSCHULER & D. ISNOW.
FILM CUTTING INDICATOR.
APPLICATION FILED MAR. 27, 1917.
1,245,420.
Patented Nov. 6, 1917.
3 SHEETS—SHEET 1.
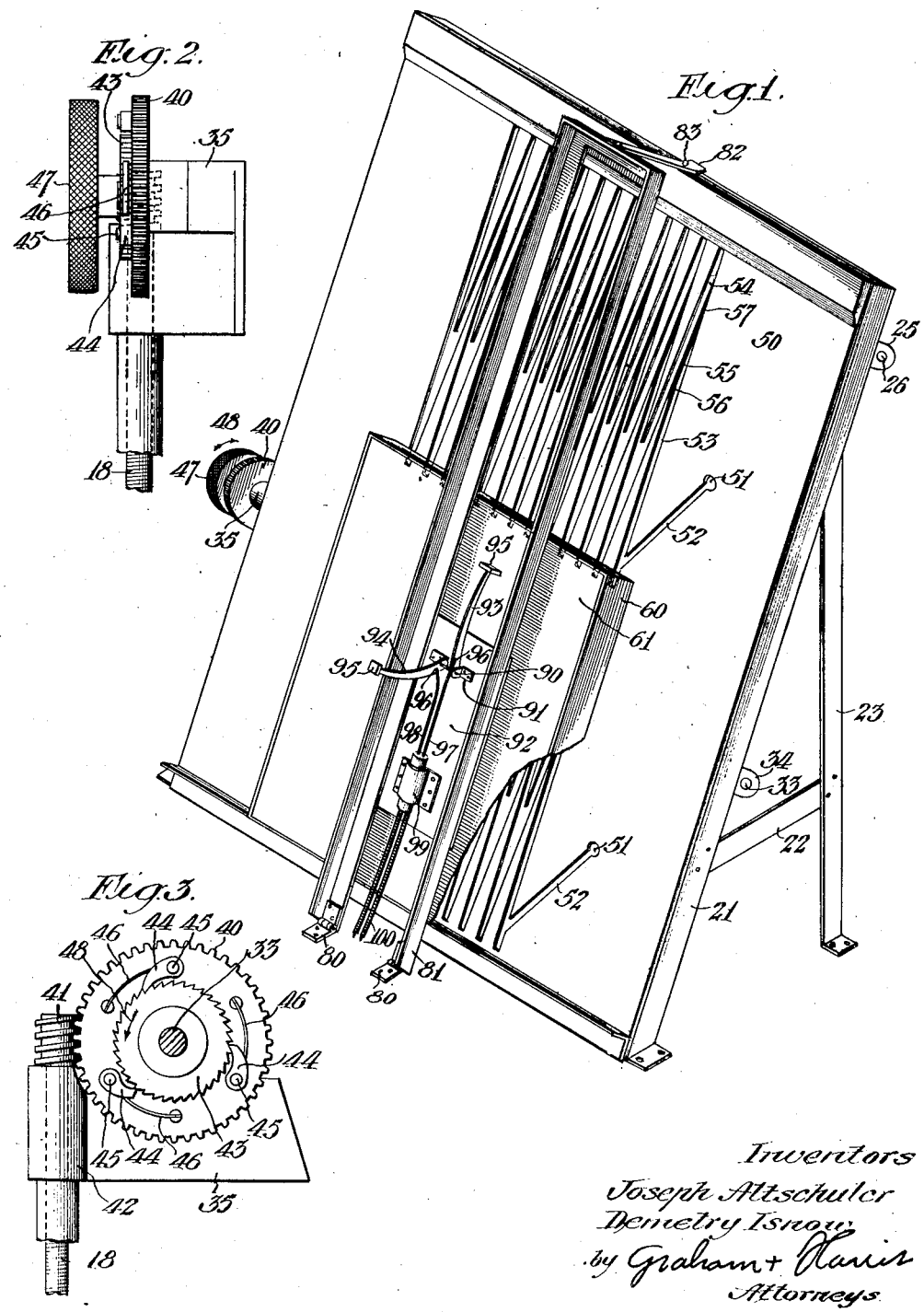
Inventors
Joseph Altschuler
Demetry Isnow
by Graham + Harris
Attorneys

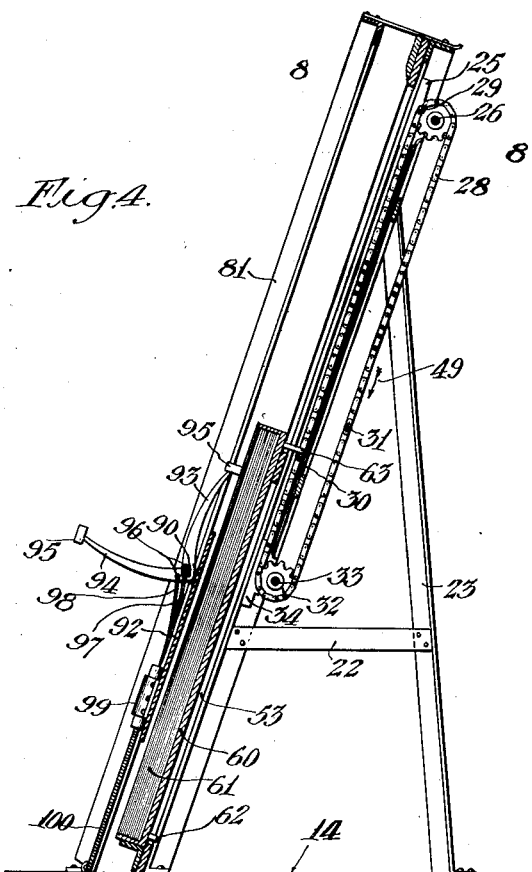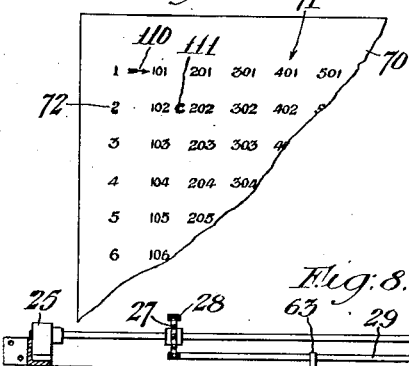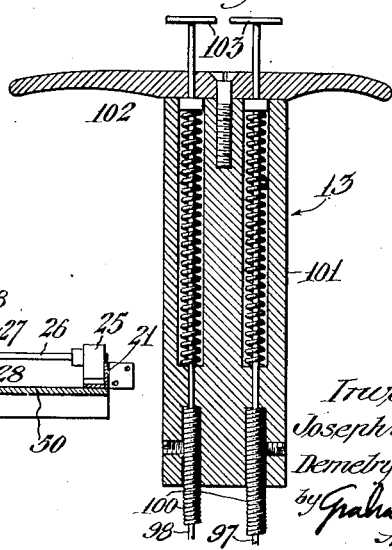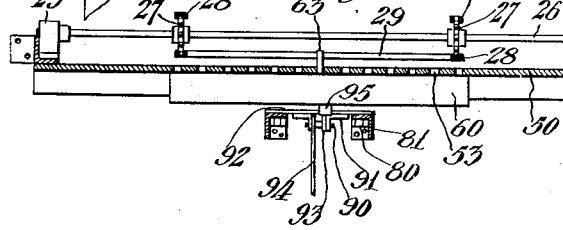

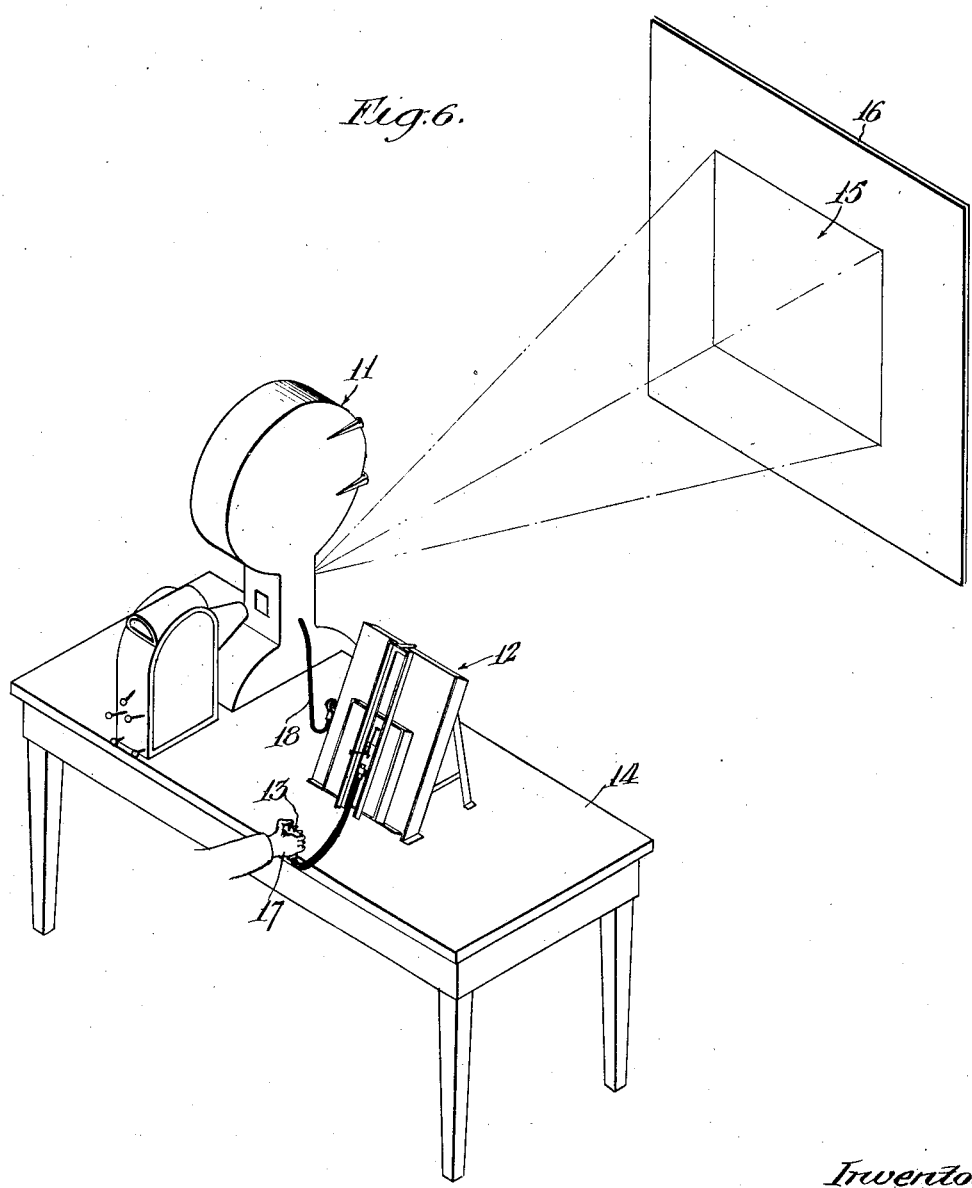

UNITED STATES PATENT OFFICE.

JOSEPH ALTSCHULER AND DEMETRY ISNOW, OF LOS ANGELES, CALIFORNIA.

FILM-CUTTING INDICATOR.

1,245,420.   Specification of Letters Patent.   Patented Nov. 6, 1917.

Application filed March 27, 1917. Serial No. 157,819.

*To all whom it may concern:*

Be it known that we, JOSEPH ALTSCHULER and DEMETRY ISNOW, the former being a citizen of the United States and the latter being a subject of the Czar of Russia, both residing at Los Angeles, in the county of Los Angeles and State of California, have invented a new and useful Film-Cutting Indicator, of which the following is a specification.

Our invention relates to the motion picture art, and more particularly to the manufacture and repair of motion picture films. In the manufacture and operation of such films, it is necessary, on many occasions, to carefully inspect the films for the purpose of making proposed changes in the appearance or arrangement thereof, or for the purpose of cutting out defective or undesirable portions of the film which may be replaced with new portions of the same kind, or portions of a different nature. The person who inspects the film does not ordinarily do the actual work of changing it, and the principal object of our invention is to provide means whereby one person may inspect the film and make a suitable record by means of which an entirely different person may make the proposed changes. For example, it is common practice for the director, or for other persons in the employ of the motion picture company, to carefully inspect the films for the purpose of changing the arrangement concerning sub-titles, or cutting out undesirable portions thereof. Our invention has a particular utility in this connection, as by its use a director can leave an unmistakable written record of any changes which he desires to make in the film, and this record can be utilized by the actual operators in making the necessary changes in the film.

In the same manner our invention may be utilized for the purpose of repairing defective films, the work of reconstruction or repair being greatly facilitated by the accurate record possible by the use of our invention.

Further objects and advantages will be made evident hereinafter.

Referring to the drawings, which are for illustrative purposes only:

Figure 1 is a perspective view of a portion of our invention.

Fig. 2 is a front view of the ratchet mechanism, and

Fig. 3 is a side view of the ratchet mechanism employed.

Fig. 4 is a side view, partly in section, showing certain details of construction.

Fig. 5 is a view of a portion of the record sheet.

Fig. 6 is a perspective view of our invention, showing the method of operating same.

Fig. 7 is a view, partly in section, of the hand operating mechanism.

Fig. 8 is a section on a line 8—8 Fig. 4.

Referring to Fig. 6 of the drawing, it will be seen that the invention really consists of a projector 11, a film cutting indicator 12, and an operating mechanism 13, the projector 11 and the film cutting indicator 12 being preferably assembled on a table 14 and run by suitable driving means, not shown, the projector 11 containing the motion picture film which it is desired to inspect and throwing the image from that film, as shown at 15, on a suitable screen 16. The operator, whose hand is shown at 17, holds the operating mechanism 13 and actuates it whenever he sees anything on the screen 16 which he desires to change, alter or rearrange. He may at the same time dictate notes to a stenographer, or into a dictating machine, for the purpose of making the direction given by him more intelligible to the operator who does the actual work on the film. The screen 16 and the projector 11 may be of any suitable character, the mechanism of the projector 11 being connected to the film cutting indicator 12 through a flexible shaft 18.

The film cutting indicator 12 consists of a frame 21, that shown being formed of angle iron and being connected by means of a bracket 22 and a brace 23 to a suitable table or base 14. Mounted in suitable bearings 25 and secured to the frame 21 is an upper shaft 26 carrying two sprockets 27 over which chains 28 pass. Secured between the chains 28 are three cross bars 29, 30 and 31, these bars being cylindrical in section and extending across a greater portion of the frame 21, somewhat below the upper or forward surface thereof. The chains 28 also pass over sprockets 32 carried on a lower shaft 33, this shaft being carried at one end in a bearing 34 and being carried at its other end in a bearing 35. Turning freely on the lower shaft 33 is a worm gear 40, this worm gear being driven from a worm 41 which is in turn driven from the flexible shaft 18 connected to the projector 11, this flexible shaft being mounted in a suitable bearing 42 forming a part of the bearing 35. Rigidly secured on the lower shaft 33 is a ratchet wheel 43 which is engaged by one of three pawls 44, these pawls being pivoted on pins 45 secured in the worm gear 40 and being forced into engagement with the teeth of the ratchet wheel 43 by flat springs 46.

Rigidly secured on the outer end of the lower shaft 33 is an operating hand wheel 47, the pawls 44 and the teeth in the ratchet wheel 43 being so arranged that the lower shaft 33 can be actuated in the direction of the arrows 48 without the necessity for turning the worm gear 40, thus moving the chains 28 and the cross bars 29, 30 and 31 in the direction of the arrows 49, this ratchet adjustment being for the purpose of making the initial setting of the machine.

Secured to the frame 21 is a slotted plate 50, this slotted plate having entering openings 51 formed therein, these openings communicating with starting slots 52 which are considerably inclined and which communicate at their lower end with up-slots 53. The up-slots 53 communicate at their upper end with down-slots 54, flat springs 55 being secured at the point 56 of the dividing material between the slots 53 and 54, these flat springs normally pressing against the side wall of the up-slots 53, as shown at the point 57.

Secured in a carrier 60 is a record sheet pad 61. The carrier 60 has a short pin 62 near the center and at the lower end thereof, and a long pin 63 at the center near the top thereof. The long pin 63 is of sufficient length to reach into and engage the cross bars 29, 30 and 31 and to be actuated thereby. The sprockets 27 are so located that the cross bars 29, 30 and 31 release the long pin 63 as the portions of the chains 28, to which the cross bars are attached, pass around the sprockets 27. The pins 62 and 63 are so located that they can be readily placed in the entering openings 51 of the slotted plate 50, sliding downwardly through the starting slots 52 into the bottom of the up-slots 53, the cross bars 29, 30 and 31 being turned by means of the operating hand wheel 47 into such a position as to allow of this and to allow one of the cross bars, for example, cross bar 29, to be in such a position that the long pin 63 is immediately forced upward through the up-slot 53 upon any further actuation of the lower shaft 33. As the lower shaft 33 is actuated, the long pin 63 is carried upwardly through the up-slots 53, the flat spring 55 snapping away from the point 57 to allow the pin 63 to pass, and immediately snapping back into place after the pin has passed. When the pin 63 has reached its upper position, it is released due to the portions of the chains to which the cross bar 29 is secured passing around the sprockets 27, thereby allowing the carrier 60 to drop, the pin 63 passing through the down-slot 54 to its bottom position, in which position it is immediately engaged and lifted by a continued movement of the succeeding cross bar 31. It will thus be seen that the carrier 60 is lifted slowly along a straight path, dropped suddenly, and lifted slowly along a succeeding path, being guided in parallel relationship by the pins 62 and 63 which slide in the slots 53 and 54 of the slotted plate 50.

Located in the carrier 60 is a pad containing a series of record sheets 70, these record sheets having a series of parallel columns 71 in which a numerical series of numbers 72 are printed, these numbers being so spaced and located, and the mechanism of the projector 11 and the film cutting indicator 12 being so arranged, that these numbers indicate successive feet of the film being run in the projector 11 and projected by that projector on the screen 16.

Secured to the table 24, by means of a hinge 80, is a printing mechanism frame 81, this frame being secured by means of a spring latch 82 and a pin 83 to the top of the frame 21. The frame 81 is hinged, as shown at 80, to allow the record sheet pad 70 to be readily replaced and removed from the carrier 60 and to allow the carrier 60 to be removed and replaced at a starting point after a record has been made.

Pivoted on a pin 90, secured to a plate 91 of a cross bar 92 of the printing mechanism frame 81, are two printing levers 93 and 94, each of these levers carrying a type member 95 at its outer end thereof. Secured in holes 96 in the printing levers 93 and 93 is a pair of flexible wires 97 and 98, these wires running through a bearing 99 into flexible tubes 100 which connect into a body 101 of the hand operating mechanism 13. This hand operating mechanism 13 has a grip bar 102 and is provided with two keys 103, each of which is connected to one of the flexible wires 97. The operator, by depressing one of the keys 103, can actuate either of the printing levers 93 or 94 through its proper flexible wire 97, this movement of the printing levers throwing the type members 95 sharply into contact with the top record sheet 70 and marking a suitable character thereon, such as the arrow 110 or the letter 111 shown in Fig. 5, opposite the proper number of the numerical series of numbers 72 on the record sheet 70.

The method of operation is as follows:

The projector 11 being run by any suitable means, and provided with a suitable illuminous source, the image of the motion picture to be inspected is thrown upon the screen 16 in a position where it can be readily reviewed by the inspector who grasps the hand operating mechanism 13 while he views the film. Whenever he wishes to indicate any change in the film, he presses down on one of the keys 103, thereby throwing one of the type members 95 up and impressing a character, such as 110 or 111, on the record sheet 70. As the record sheet 70 is being constantly moved in synchronism with the film by means of the apparatus previously described, it is evident that the numerical series 72 will indicate feet of film and that the record sheet 70 will correctly indicate the inspector's intentions in regard to the film.

Our invention consists broadly in the conception of a record sheet which is run in synchronism with the film being inspected and on which directions for changes in the film can be readily indicated by a person viewing the film, the film being either projected or viewed directly by the inspector.

Our invention further consists in the conception of a record sheet having parallel columns indicating successive feet of the film, as by the use of such a record sheet the directions relating to a large number of feet of film can be readily recorded in a small space.

Our invention further consists in the novel mechanism shown in the drawings and described in the specification.

We claim as our invention:—

1. The method of recording proposed alterations in a motion picture film, which consists in simultaneously actuating the film and a record sheet containing identifying marks indicating definite portions of the film; inspecting the film; and simultaneously indicating proposed changes on the record sheet.

2. An apparatus for recording proposed changes in a motion picture film, comprising a record sheet having marks thereon identifying definite portions of the film; means for actuating said record sheet in synchronism with the film; and means for indicating on said sheet, in a certain relationship with said marks, a certain proposed action to be taken with relation to the corresponding portion of said film.

3. An apparatus for recording proposed changes in a motion picture film, comprising a record sheet having a series of marks thereon, each mark having a definite relationship with a portion of a motion picture film; means for actuating said film and said sheet simultaneously; and means whereby an operator can indicate on said record sheet, in definite relationship with said marks, proposed changes in the corresponding portions of said film.

4. An apparatus for recording proposed changes in a motion picture film, comprising a record sheet having a numerical series printed thereon, each number of said numerical series indicating a definite portion of a motion picture film; means for actuating said film and said sheet simultaneously; and means whereby an operator can indicate on said record sheet, in definite relationship with said marks, proposed changes in the corresponding portions of said film.

5. An apparatus for recording proposed changes in a motion picture film, comprising a record sheet having a series of marks thereon, each mark having a definite relationship with a portion of a motion picture film; a projector for said film; means for moving said record sheet in synchronism with said moving motion picture film of said projector; and means whereby an operator can indicate on said record sheet, in definite relationship with said marks, proposed changes in the corresponding portions of said film.

6. An apparatus for recording proposed changes in a motion picture film, comprising a record sheet having a numerical series printed thereon, each number of said numerical series indicating a definite portion of a motion picture film; a projector for said film; means for moving said record sheet in synchronism with said moving motion picture film of said projector; and means whereby an operator can indicate on said record sheet, in definite relationship with said marks, proposed changes in the corresponding portions of said film.

7. An apparatus for recording proposed changes in a motion picture film, comprising a record sheet having a series of marks thereon, each mark having a definite relationship with a portion of a motion picture film; means for actuating said film and said sheet simultaneously; and means whereby an operator inspecting said motion picture film can impress suitable directional markings on said record sheet.

8. An apparatus for recording proposed changes in a motion picture film, comprising a record sheet having a numerical series printed thereon, each number of said numerical series indicating a definite portion of a motion picture film; means for actuating said film and said sheet simultaneously; and means whereby an operator inspecting said motion picture film can impress suitable directional markings on said record sheet.

9. An apparatus for recording proposed changes in a motion picture film, comprising a record sheet having a series of marks thereon, each mark having a definite relationship with a portion of a motion picture film; a projector for said film; means for moving said record sheet in synchronism with said moving motion picture film of said projector; and means whereby an operator inspecting said motion picture film can impress suitable directional markings on said record sheet.

10. An apparatus for recording proposed changes in a motion picture film, comprising a record sheet having a numerical series printed thereon, each number of said numerical series indicating a definite portion of a motion picture film; a projector for said film; means for moving said record sheet in synchronism with said moving motion picture film of said projector; and means whereby an operator inspecting said motion picture film can impress suitable directional markings on said record sheet.

11. An apparatus for recording proposed changes in a motion picture film, comprising a record sheet having a series of marks thereon, each mark having a definite relationship with a portion of a motion picture film; means for actuating said film and said sheet simultaneously; marking means for marking suitable directions on said record sheet; and means by which an operator viewing said film can actuate said marking means.

12. An apparatus for recording proposed changes in a motion picture film, comprising a record sheet having a numerical series printed thereon, each number of said numerical series indicating a definite portion of a motion picture film; means for actuating said film and said sheet simultaneously; marking means for marking suitable directions on said record sheet; and means by which an operator viewing said film can actuate said marking means.

13. An apparatus for recording proposed changes in a motion picture film, comprising a record sheet having a series of marks thereon, each mark having a definite relationship with a portion of a motion picture film; a projector for said film; means for moving said record sheet in synchronism with said moving motion picture film of said projector; marking means for marking suitable directions on said record sheet; and means by which an operator viewing said film can actuate said marking means.

14. An apparatus for recording proposed changes in a motion picture film, comprising a record sheet having a numerical series printed thereon, each number of said numerical series indicating a definite portion of a motion picture film; a projector for said film; means for moving said record sheet in synchronism with said moving motion picture film of said projector; marking means for marking suitable directions on said record sheet; and means by which an operator viewing said film can actuate said marking means.

In testimony whereof, we have hereunto set our hands, at Los Angeles, California, this 14th day of March, 1917.

JOSEPH ALTSCHULER.
DEMETRY ISNOW.